(No Model.)
W. M. McDOUGALL.
METHOD OF MANUFACTURING DOUBLE CUT FILES.
No. 371,778. Patented Oct. 18, 1887.
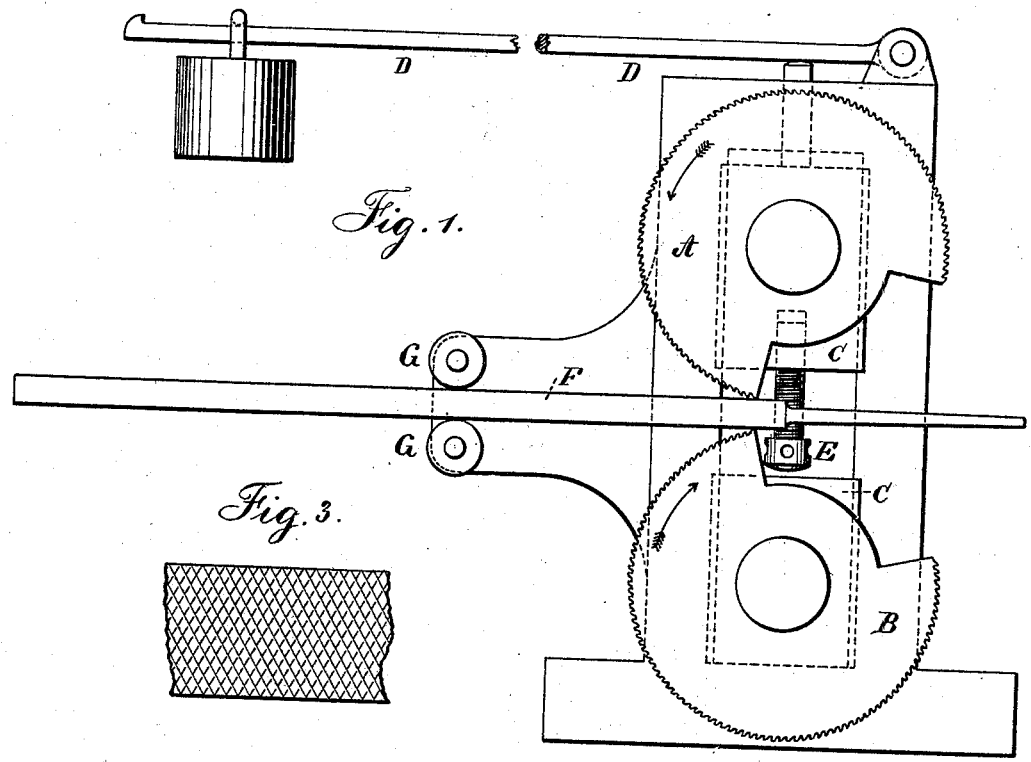
Fig. 1.
Fig. 3.
Fig. 2.
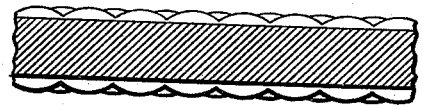
Fig. 4.
Witnesses:
J. Stait
Chas N. Smith
Inventor:
William M. McDougall
per Lemuel W. Serrell atty.

UNITED STATES PATENT OFFICE.

WILLIAM M. McDOUGALL, OF GROVESTEND, NEW JERSEY.

METHOD OF MANUFACTURING DOUBLE-CUT FILES.

SPECIFICATION forming part of Letters Patent No. 371,778, dated October 18, 1887.

Application filed June 13, 1887. Serial No. 241,110. (No model.)

*To all whom it may concern:*

Be it known that I, WILLIAM M. MC-DOUGALL, of Grovestend, in the county of Essex and State of New Jersey, have invented an Improvement in the Method of Manufacturing Files, of which the following is a specification.

In the manufacture of files it is usual to cut the surfaces twice, the under cut being at an angle to the upper cut. If one cut alone was made use of, the surface would be a series of chisel-edges, and not adapted to many purposes; hence the second cut is made use of, the under cut actually subdividing the chisel-edges raised by the upper cut.

In manufacturing files it is usual to cut the surface of the blank with a chisel and then to grind down or even the chisel-edges, so that the points that are formed at the junctions of the under and upper cuts may not be sharp and V-shaped, but slightly rounding, to insure greater uniformity in the action of the file and to prevent the points breaking off. In this ordinary mode of making files considerable expense is involved in applying the under cut and in dressing the same off ready to receive the upper cut.

My present improvement relates to a method of producing the under cut with accuracy and rapidity and with but little expense, so that the dressing or grinding operation is dispensed with, thereby lessening cost and insuring greater rapidity.

In the drawings, Figure 1 is a view illustrating the instrumentalities employed in making the under cut. Fig. 2 is a section in larger size, showing the indentations of the under cut. Fig. 3 is a plan of part of a file-face, and Fig. 4 is a cross-section of the file in large size through the upper cut.

The rolls A B are made with shafts that are supported in boxes or bearings C, and the upper roll is pressed toward the lower roll by weighted levers D, acting upon each sliding journal box, and stops or limiting-screws E prevent the rolls coming too close together. The rolls A B are cut out at portions of their peripheries, similar to the rolls employed in rolling knives, so that the file-blank F may be freely passed in between the rolls, and by them be grasped and moved endwise toward the attendant. The guide-rolls G serve to keep the file-blank in its proper relation to the rolls A B. The surfaces of the rolls A B are made with diagonal chisel-shaped ribs, the counterpart of the finished undercut surfaces of a file and the rolls are of hardened steel. These rolls may be made in a manner similar to those used for transfer bank-note engraving—that is to say, a blank of steel is to be prepared with the undercut incisions and ground with accuracy and then hardened, and then the rolls A B are to be rolled upon the same, while in a soft condition, to take the imprint of the blank, and then hardened, so that when the file-blanks are subjected to the action of said rolls A B the surfaces will be grooved or channeled at one operation and with great rapidity, so as to correspond with the completed undercut file-surface ready to receive the upper cut, which is done by machine or by hand in the usual manner.

By this method of applying the under cut a great saving is effected in the cost, and the steel is improved by the consolidating action of the rolls, so that the points of the teeth are more durable and perfect than in the ordinary method of manufacture.

I claim as my invention—

The method herein specified of manufacturing files, consisting in subjecting the soft-steel file-blank to the action of rolls with chisel-shaped projections, to prepare the surface of the blank at one operation to correspond with the under cut and then applying the upper cut diagonally to the lines of the under cut by a chisel to form the complete file ready for tempering, substantially as set forth.

Signed by me this 8th day of June, 1887.

W. M. McDOUGALL.

Witnesses:
GEO. T. PINCKNEY,
WILLIAM G. MOTT.